US006370538B1

(12) United States Patent
Lamping et al.

(10) Patent No.: US 6,370,538 B1
(45) Date of Patent: Apr. 9, 2002

(54) DIRECT MANIPULATION INTERFACE FOR DOCUMENT PROPERTIES

(75) Inventors: John O. Lamping, Los Altos; Michael P. Salisbury, Mountain View, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/444,796

(22) Filed: Nov. 22, 1999

(51) Int. Cl.$^7$ .............................. G06F 17/00; G06F 7/00
(52) U.S. Cl. ...................................................... 707/102
(58) Field of Search .................... 707/1–10, 100–104.1, 707/200–206, 500–542; 345/769, 853, 804, 581, 520, 762, 594

(56) References Cited

U.S. PATENT DOCUMENTS

| | | | | |
|---|---|---|---|---|
| 5,584,035 A | * | 12/1996 | Duggan et al. | 345/619 |
| 6,189,000 B1 | * | 2/2001 | Gwertzman et al. | 705/26 |
| 6,240,429 B1 | * | 5/2001 | Thornton et al. | 707/500 |
| 6,253,217 B1 | * | 6/2001 | Dourish et al. | 707/500 |
| 6,266,670 B1 | * | 7/2001 | LaMarca et al. | 707/100 |
| 6,266,682 B1 | * | 7/2001 | LaMarca et al. | 707/5 |
| 6,269,380 B1 | * | 7/2001 | Terry et al. | 707/1 |
| 6,308,179 B1 | * | 10/2001 | Petersen et al. | 707/10 |
| 6,324,551 B1 | * | 11/2001 | Lamping et al. | 707/104.1 |
| 6,330,573 B1 | * | 12/2001 | Salisbury et al. | 707/203 |

* cited by examiner

Primary Examiner—John Breene
Assistant Examiner—Linh M Pham
(74) Attorney, Agent, or Firm—Fay, Sharpe, Fagan, Minnich & McKee, LLP

(57) ABSTRACT

A document management system A is employed to provide arbitrary properties to documents 40, such that the hierarchical constraints of previous file systems are avoided. An interface 10 is provided for visualizing document properties and a location of the documents within an organized arrangement. A repository C holds documents and the attached properties. A first containment structure 26 is designed to portray representations of documents in the repository having a first property type. A second containment structure 24 is provided to portray representations of documents in the repository having a second property type. Within the first containment structure 26 is a first document 40 having a first property type. A movement mechanism 43 is designed to move the representation of the first document 40, stored in the first containment structure 26 to a location in the second containment structure 24. A property analyzer 47 senses operation of the movement mechanism 43 and analyzes properties attached to the first document 40 when the representation of the first document is to be moved into the second containment structure. A property changer 49 alters at least one of the properties of the first document 40 based on information received from the property analyzer 47. By this arrangement, a user may generate a structure of document organization in a system which separates a document's content and the properties of a document.

14 Claims, 16 Drawing Sheets

ATTRIBUTE TREE BROWSER

ARRANGE BY: ☐ MAIL ☐ PROJECT

- 📁 NO (2)
  - 📁 BARF (1)
  - 📁 FOO (1)
- 📁 YES (5)
  - 📁 BARF (3)
    - 📄 BLUE
    - 📄 NOTE TO FRED ← 90
    - 📄 PROGRAM
  - 📁 FOO (2)
    - 📄 PACKRAT DESKTOP STATE
    - 📄 RED

QUERY: ALL

PROPERTY COLUMN BROWSER

| NAME | PROJECT | OLD | MAIL |
|---|---|---|---|
| PROGRAM | BARF | | YES |
| NOTE TO FRED | BARF  ← 98 | | YES |
| NOTE FROM FRED | FOO | | NO |
| PACKRAT DESKTOP STATE | FOO | YES | YES |
| BLUE | BARF | YES | YES |
| RED | FOO | | YES |
| AA | BARF | | NO |

QUERY: PROJECT()

*FIG. 7*

ATTRIBUTE TREE BROWSER

ARRANGE BY: ☐ MAIL ☐ PROJECT

- 📁 NO (3)
  - 📁 BARF (1)
    - 📄 AA
  - 📁 FOO (2)
    - 📄 BLUE ← 104
    - 📄 NOTE FROM FRED
- 📁 YES (4)
  - 📁 BARF (2)
    - 📄 NOTE TO FRED
    - 📄 PROGRAM
  - 📁 FOO (2)
    - 📄 PACKRAT DESKTOP STATE
    - 📄 RED

QUERY: ALL

PROPERTY COLUMN BROWSER — 64

| NAME | PROJECT | OLD | MAIL |
|---|---|---|---|
| PROGRAM | BARF | | YES |
| NOTE TO FRED | FOO | | YES |
| NOTE FROM FRED | FOO | | NO |
| PACKRAT DESKTOP STATE | FOO | YES | YES |
| BLUE ← 104 | FOO ← 108 | YES | NO |
| RED | FOO | | YES |
| AA | BARF | | NO |

QUERY: PROJECT()

*FIG. 9*

DIRECT MANIPULATION INTERFACE FOR DOCUMENT PROPERTIES

FIELD OF THE INVENTION

The present invention is directed to a document management system. More particularly, the present invention is directed to a user interface which interacts with such a document management system, and portrays property value organizations as containment structures which allows the user to alter properties by direct manipulation of the containment structure.

BACKGROUND OF THE INVENTION

The most common tool for organizing a document space relies on a hierarchical storage system. Documents are treated as files that exist in directories or folders, which are themselves contained in other directories, thereby creating a hierarchy that provides the structure for document space interactions. Each directory in a hierarchy of directories will commonly contain a number of individual files. Typically, files and directories are given alpha-numeric, mnemonic names in large storage volumes shared via a network. In such a network, individual users may be assigned specific directories.

In a traditional file system of this type, documents typically reside in one and only one directory. However, a user may wish to have the document belong to a variety of collections or folders according to a user's organizational structure. For example, while the document may belong in a "very important" folder, the user may wish to also define the document as a group of "project B" documents.

Recently, systems have been developed where the user has provided access to properties which are selectively attached to a document by a user. The document with the attached properties may be stored at a location separate from the content of the document. The content of the document may be stored at a location outside of the document management system. Thereafter, a user is able to retrieve the document using at least one of the attached properties, such retrieving including obtaining the content of the document from wherever it resides.

One such system as summarized above, is described in U.S. patent application Ser. No. 09/143,551, Karin Petersen, et al., entitled property-based user level document management; and U.S. Pat. No. 09/144,032, Anthony G. LaMarca, et al. entitled, Clustering Related Files In A Document Management System, both assigned to the assignee of the present application and hereby incorporated by reference.

Another aspect of the newer data management systems described is that they can handle a wide variety of kinds of data as documents. Documents, in these systems can include not only familiar document types, including, but not limited to word processing files, presentations, and mail messages, but other types as well, including, but not limited to, contact information, and to-do items, and dynamic information, including, but not limited to, system status, portable device status, and user activity information.

Another aspect of the newer data management systems described, is that unlike in existing conventional hierarchical file systems, properties can be used to express multiple organizations. By separating the link between content and location, as possible with the cited document management system, a user is provided with greater flexibility in its storage management arrangements and document organization.

While this more recent development provides greater flexibility, users do not always need to work at a level of individual properties, but often would prefer to work at a level of meaningful organizations built out of those properties.

Thus, the present invention is directed to a user interface which allows flexibility of arrangements while also providing a meaningful organization of documents based on the existing properties.

SUMMARY OF THE INVENTION

In a document management system which employs properties to organized documents, a direct manipulation interface for visualizing document properties is provided. A repository configuration, which may be a single repository or multiple repositories, stores documents having attached properties. The content of the document possibly being stored at a location separate from the attached properties of the document. A first containment structure is configured to hold representations of the documents in the repository having a first property type. A second containment structure is configured to hold representations of documents in the repository having a second property type. A representation of a first document having the first property type is stored in the first containment structure. Further provided is a movement mechanism designed to move the representation of the first document, stored in the first containment structure to a location in the second containment structure. A property analyzer will sense operation of the movement mechanism and analyze properties attached to the first document when the representation of the first document is to be moved into the second containment structure. A property changer will alter at least one of the properties of the first document based on the information received from the property analyzer such that the document's properties are consistent with the newly defined location.

With attention to another aspect of the present invention, inherent constraints exist within the document management system related to the movement of a document from a first location to a second location.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof, and wherein:

FIGS. 4–15 depict operations of the present invention; and

DETAILED DESCRIPTION OF THE PREFERRED EMBODIMENTS

Figure 1:
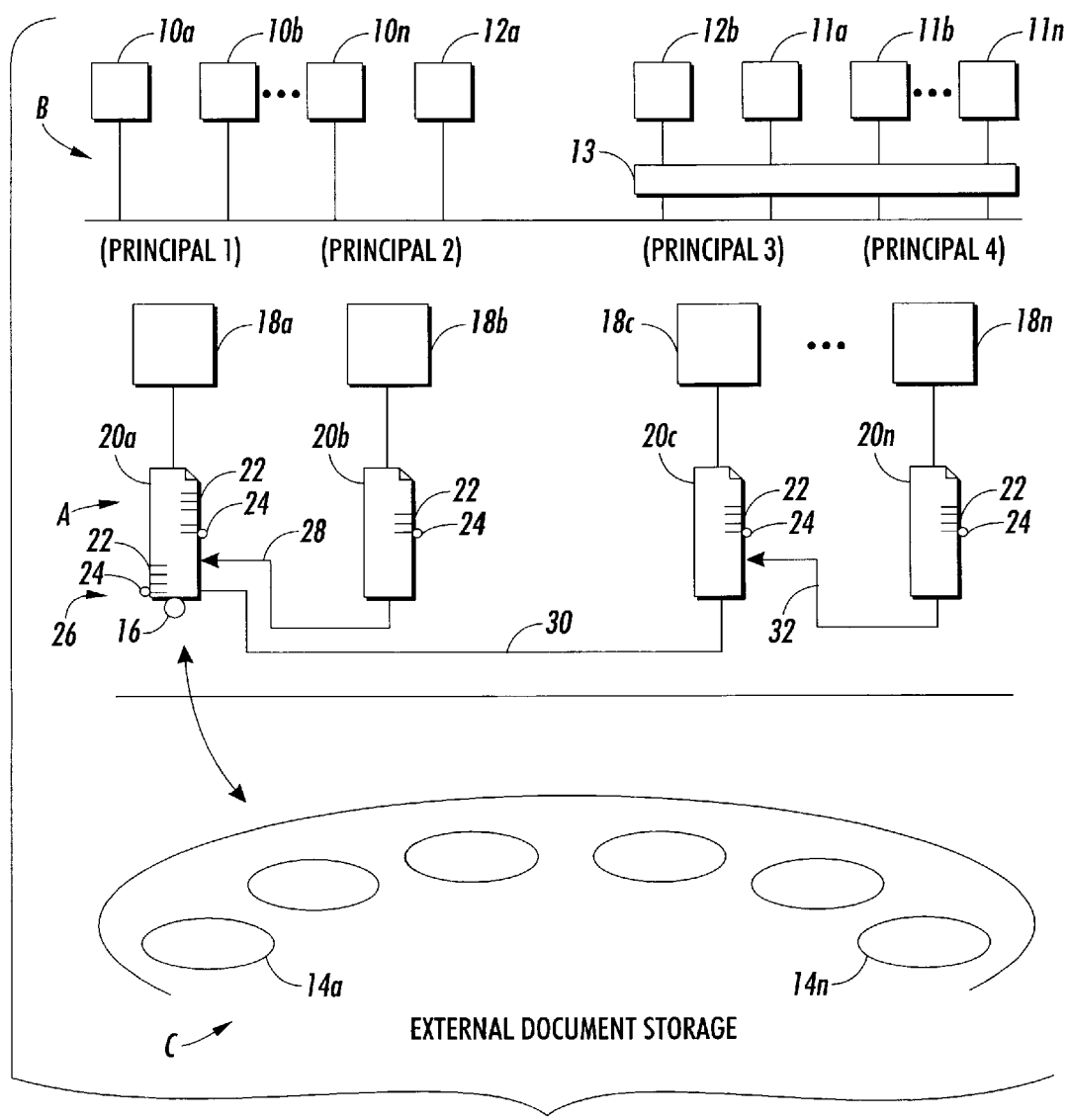
FIG. 1 is a representation of a document management system within which the concepts of the present invention are implemented.

FIG. 1 sets forth the architecture of a document management system (DMS) A in which the present invention may be implemented. It is to be appreciated, however, that the concepts of the invention may be applicable to other document management systems.

Document management system (DMS) A is shown configured for operation with front-end components B, and back-end components C. Front-end components B include applications 10a–10n and 11a–11n, such as word processing applications, mail applications among others. Some of the applications are considered DMS aware 10a–10n which means these applications understand DMS protocols for storing, retrieving and otherwise interacting with DMS A. Other components are considered non-DMS aware 11a–11n. Browsers 12a (DMS aware) and 12b (nonDMS aware) are considered specialized forms of applications. In order for the nonDMS-aware applications 11a–11n and 12b to be able to communicate with DMS A, front-end translator 13 is provided.

Similarly, back-end components C can include a plurality of repositories 14a–14n, where the content of documents are stored. Such repositories can include the hard disc of a principal's computer, a file system server, a web page, a dynamic real time data transmission source, as well as other data repositories. To retrieve data content from repositories 14a–14n, bit providers, such as bit provider 16, are used. These bit providers are provided with the capability to translate appropriate storage protocols.

Principals 1–n each have their own kernel 18a–18n for managing documents, such as documents 20a–20n. Documents 20a–20n are considered to be documents the corresponding principal 1–n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a realtime data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20b–20c. As will be discussed in greater detail below, in addition to base document 20a having static properties 22 and/or active properties 24, base document 20a will also carry base properties 26 which can be static properties 22 and/or active properties 24. Static properties are shown with a "–" and active properties are shown with a "–o".

Reference documents 20b–20c are configured to interact with base document 20a. Both base documents and reference documents can also hold static properties 22 and/or active properties 24. When principals 2,3 access base document 20a for the first time, corresponding reference documents 20b–20c are created under kernels 18b–18c, respectively. Reference documents 20b–20c store links 28 and 30 to unambiguously identify their base document 20a. In particular, in the present invention each base document is stored with a document ID which is a unique identifier for that document. When reference documents 20b–20c are created, they generate links to the specific document ID of their base document. Alternatively, if principal n references reference document 20c, reference document 20n is created with a link 32 to reference document 20b of Principal 3. By this link principal n will be able to view (i.e. its document handle) the public properties principal 3 has attached to its reference document 20c as well as the base properties and public reference properties of base document 20a. This illustrates the concept of chaining.

The above described architecture allows for sharing and transmission of documents between principals and provides the flexibility needed for organizing documents. With continuing attention to FIG. 1, it is to be noted at this point that while links 28–30 are shown from one document to another, communication within DMS A is normally achieved by communication between kernels 18a–18n. Therefore, when DMS A communicates with either front-end components B, backend components C, or communication occurs between principals within DMS A, this communication occurs through kernels 18a–18n. It is however, appreciated the invention will work with other communication configurations as well.

Using the described architecture, DMS A does not require the principal to operate within a strict hierarchy such as in file or folder-type enviromnents. Rather, properties 22,24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on Reference Document 20b. By placement of these properties, principal 2 can retrieve the base document in a manner different than that envisioned by principal 1.

Further, by interacting with browser 12, a principal may run a query requesting all documents having a selected property. Specifically, a user may run query language requests over existing properties.

Therefore, DMS A manages a document space where properties are attached by different principals such that actions occur which are appropriate for a particular principal, and are not necessarily equivalent to the organizational structure of the original author of a document or even to other principals.

Another noted aspect of DMS A is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e. principal 2), since properties are maintained with the principal who put the properties onto a document.

Clustering Related Files

Figure 2:
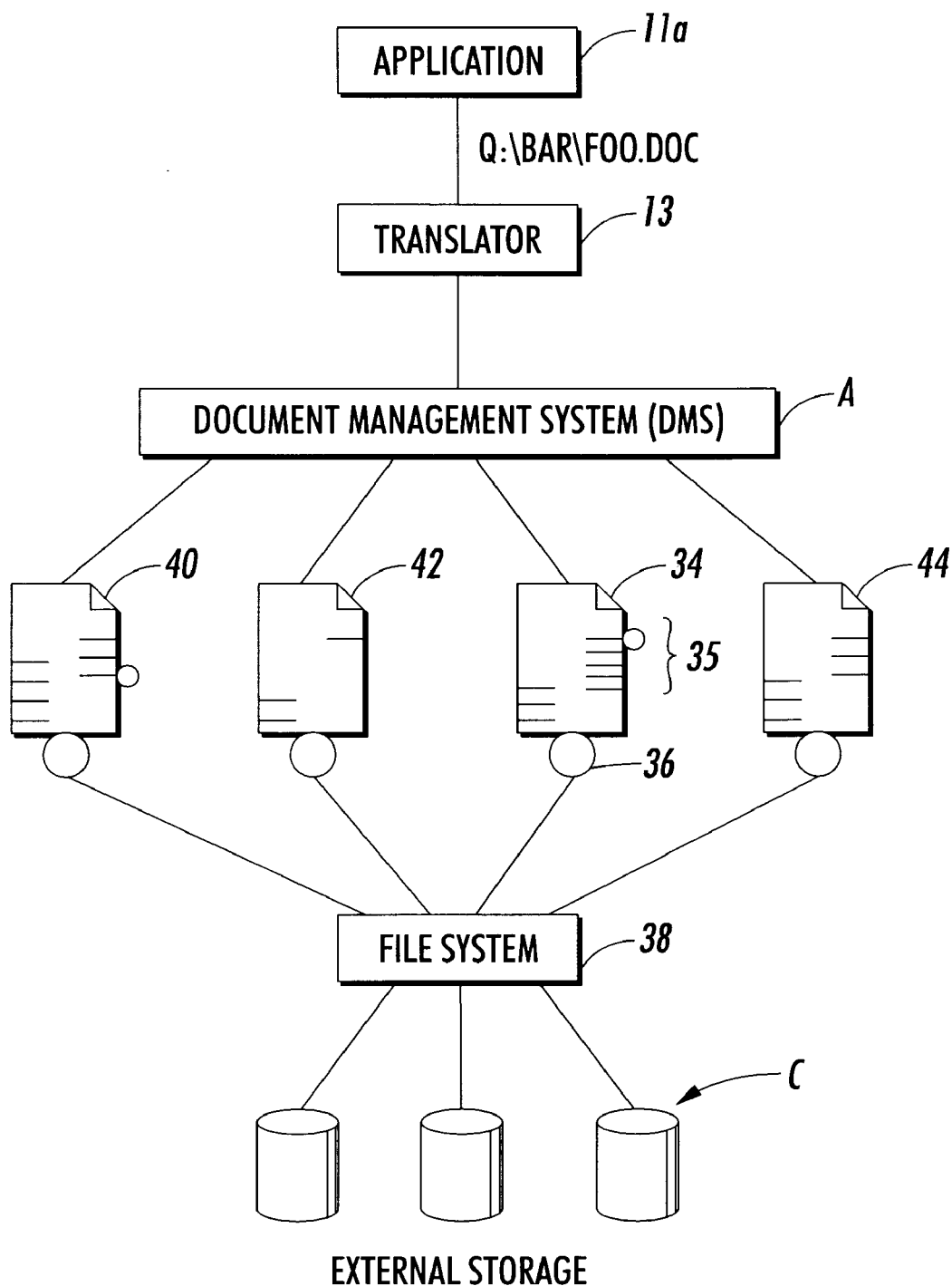
FIG. 2 illustrates translation of a hierarchical path name to the document management system protocol of a system described in FIG. 1.

FIG. 2 illustrates a manner of providing related files requested by a user. In order for application 11a to communicate with DMS A, the translator 13 is disposed therebetween, similarly shown in FIG. 1. The translator 13 converts the requests and commands from application 11a into an appropriate DMS protocol and, if necessary, provides additional commands in order to obtain the requested result.

Suppose there is a document "FOO.DOC" 34 and suppose it is contained in collection BAR. In this example, "FOO.DOC" is given a document ID of #123. If the user selects this file for editing, the DMS issues the path "Q:\#123\BAR\FOO.DOC". The tag in this case is #123 which refers to the document "FOO.DOC". "FOO.DOC" is a DMS document which can store static and active properties 35, and includes a bit provider 36 which communicates to the non-DMS aware file system 38 to store and retrieve the content of the document from external storage C.

When application 11a processes "FOO.DOC", supporting files and auxiliary data files 40, 42, 44 are generated. Application 11a will store these files in the same directory as the main document "FOO.DOC", in this case at Q:\#123\BAR\. To the application, the tag #123 looks like an ordinary sub-directory. Translator 13 notices and extracts the tag #123 in the path name. After creating the support document, the translator will attach a static property, for example "In support of Document #123", signifying that this is a support file for "FOO.DOC". The content of the supporting files are then stored in external storage C. By having a common unique static property, the DMS can easily identify and locate all files related to "FOO.DOC" regardless of where they actually reside on external storage C.

Suppose the user finds the same document "FOO.DOC", this time in a different location BLATZ. The DMS will issue the path "Q:\#123\BLATZ\FOO.DOC" for applications to access the document. When an application tries to access a supporting file "FOO.BAK", it will access it at "Q:\#123\BLATZ\FOO.BAK". On a read from a path having a tag <#x> in it, translator 13 will extract the tag <#x> and construct a dynamic collection of all files having the static property "In support of Document <#x>". The translator then looks for file "FOO.BAK" in this collection and performs the access on this document. Note that in this case we saved a file in "Q:\#123\BAR\FOO.BAK" and then later accessed the same file through the pathname "Q:\#123\BLATZ\FOO.BAK". Knowing the tag, a single query returns all the related files. Therefore, documents that are grouped together are not limited to being stored in the same directory. Rather, they are grouped based on a common property and can actually be stored at any location. Once the tag is extracted, the particular sub-directories in the path are ignored because the files are found based on the tag.

By grouping related files using the path tag of the present invention, non-DMS aware applications are assisted in locating and retrieving related and necessary files regardless of their actual location. Furthermore, supporting files which are generated for a document are not inadvertently stored in incorrect directories or document collections, since they are managed according to the path tag property assigned to them.

Figure 3:
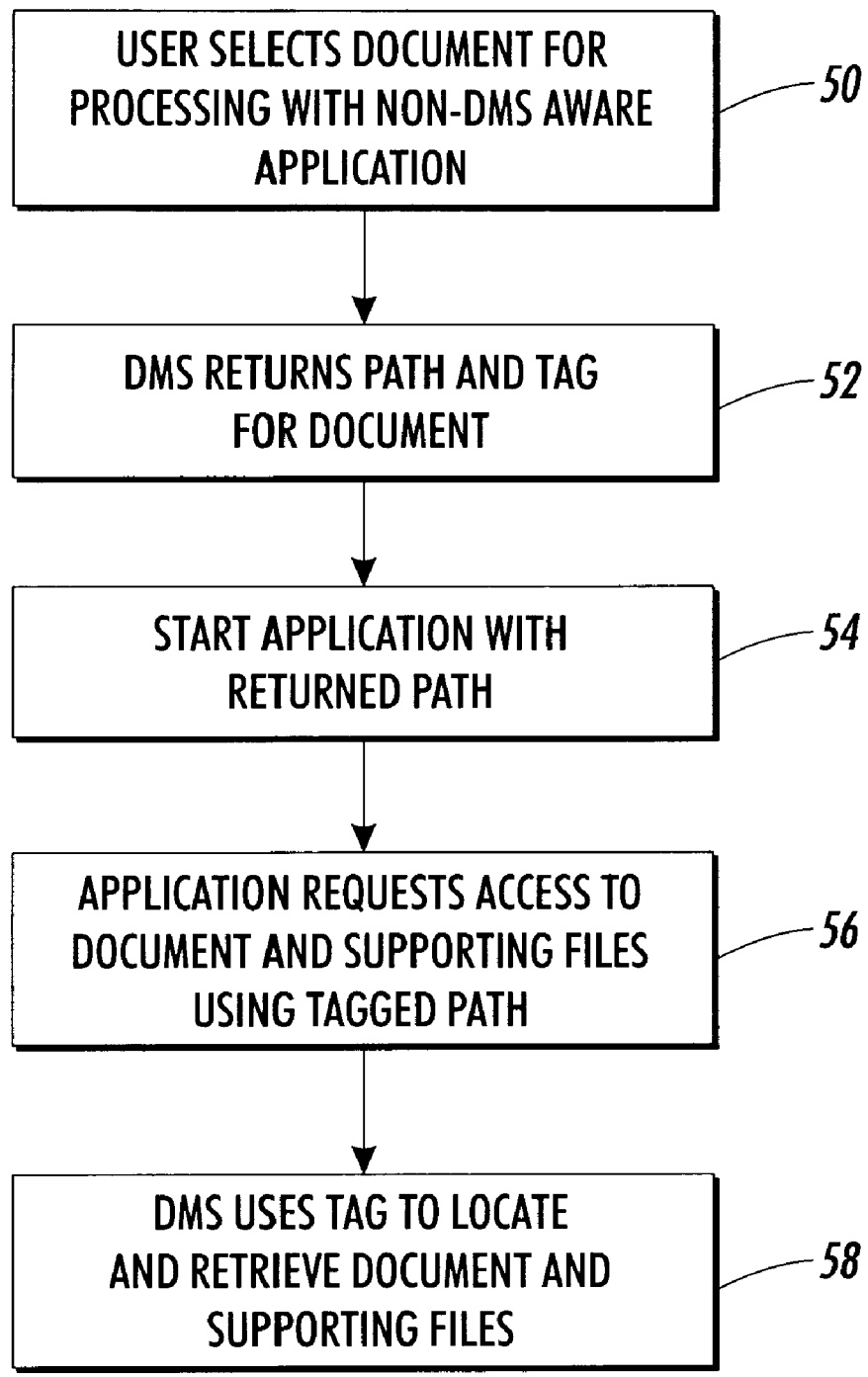
FIG. 3 is a high-level flow chart of document retrieval.

With reference to FIG. 3, exemplary processing of the foregoing is shown. A user locates a document, for example, by way of a query to the DMS which returns a collection of documents, and selects the document which is to be processed by a non-DMS aware application 50. In this case, the document has already been tagged with a unique ID in its path. The DMS returns the path and tag of the document to the application 52. The application is then started with the returned path 54. The application requests access to the document and its supporting files using the tagged path 56. The DMS, based on the tag, locates and retrieves the document and supporting files regardless of their actual location 58. In this manner, the application has access to all related files thus avoiding any potential errors in processing caused by a failure to locate necessary files.

Design of Meaningful Organizations Built Out Of Properties

The above-described architecture allows documents to be assigned arbitrary user-meaningful properties. Such an organization therefore increases flexibility with which a user may obtain, arrange and store documents or other information. However, it is acknowledged by the inventors that at times users will not want to work at the level of individual properties, but rather would prefer to work at the level of a meaningful organization built out of those properties. Therefore, the following describes a user interface to portray property value organizations as containment structures wherein the user will alter properties by direct manipulation of the containment structure.

Properties are conceptually considered consequential statements about documents, such as "shared with Doug", "published in SOSP", "backed up", "relevant to system", or "available from by laptop", etc. The described property mechanism provides, (i) directness, in that properties are attached directly to documents rather than implicitly associated with names or locations; (ii) uniformity, in that all aspects of documents are provided through properties, and (iii) fluidity, in that any document may have many properties, any of which are available as a basis for organization and retrieval at any moment.

Presently, two specific types of interfaces currently dominate the display of properties. These are queries and tables. Queries will take a Boolean expression in terms of properties and return the documents matching the expression. On the other hand, tables take a set of documents and display their values on selected properties. Each of these approaches facilitates certain kinds of searching at the cost of others. Queries allow users to exploit the inherent structure of data sets, but allow users only to work with the results of one query at a time. Tables allow users to explore more information, but they organize attributes according to pre-specified structures.

The present invention provides a model of managing and presenting data, which like queries, exploits the inherent structure of the data, and like tables, allows open-ended exploration of the data. Thus, a concept of the present invention is to use the patterns of object attributes to derive a containment structure, which is then presented to users for both exploration and manipulation.

It is to be appreciated that when implemented, the concepts of the invention will support numerous view configurations for a user. FIGS. 4–15 present a sequence of computer screens depicting one example of a view presented to a user. This view combines a traditional query with an attribute tree derived from property values. In this example, the top level of the containment hierarchy is the query, which, in the example finds all documents (from a very small collection). The next two levels of containment organize the documents into an attribute tree based on the values of two of their properties.

Figure 4:
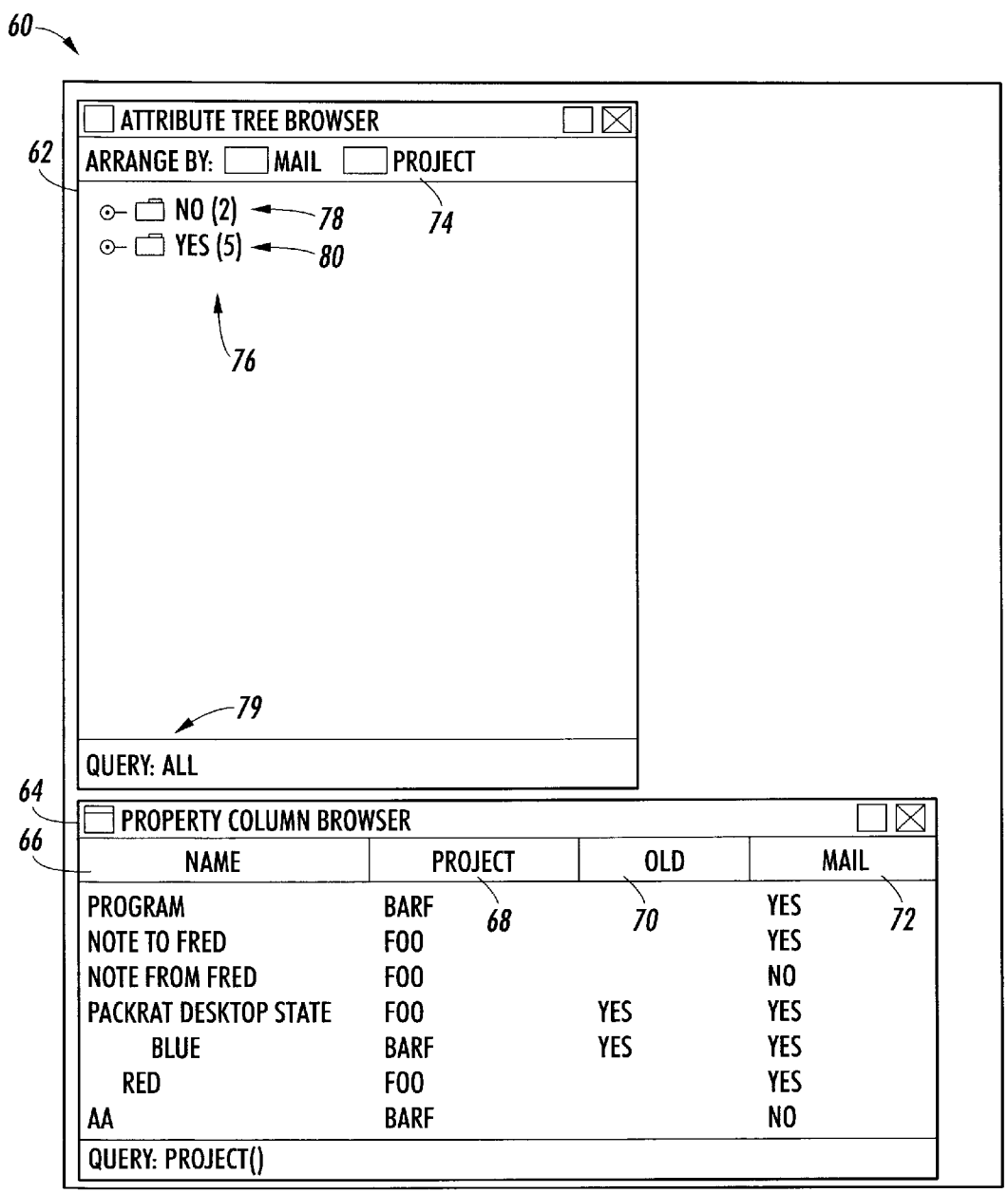

With more particular attention to FIG. 4, display 60 has displayed on it an attribute window 62 and a property column browser window 64. For this example, a small number of documents are listed. The property column browser 64 is shown simply for explanation purposes and in operation would be closed and not visible. The "Name" column 66 of window 64 lists out the names of documents which will be used in this example (i.e. program, note to Fred, note from Fred . . . ). The column "Project" 68 displays a project property attached to documents. For example, two project property names exist (barf and foo) which are attached to the corresponding document. The "old" column shows an old property which is attached to, in this example, two documents (Packrat Desktop State and blue). A mail column displays a mail property which takes on a value of either "yes" or "no") for the displayed documents. Again, the property column browser 16 is shown to assist in an understanding of the manipulation and operation of the present invention.

The attribute tree window 62 combines a document selection query bar 79 (in this case, specifying all documents), a dynamic hierarchy description 74 (i.e. arrange by mail), and a displayed attribute tree 76. The concept of a containment structure may apply to the overall combination of the query bar and the attribute tree, as well as the representation of documents within this structure. Therefore, the query portion of the hierarchy will search for and find all documents, which will then be organized according to whether they are considered mail or not. In FIG. 4, the attribute tree 76 organizes the documents in accordance as whether they are not "mail" 78 or whether they are mail 80. Reviewing property column browser 64 confirms that of the seven documents in the "Name" 66 column, five are listed as mail and two are not mail.

Figure 5:
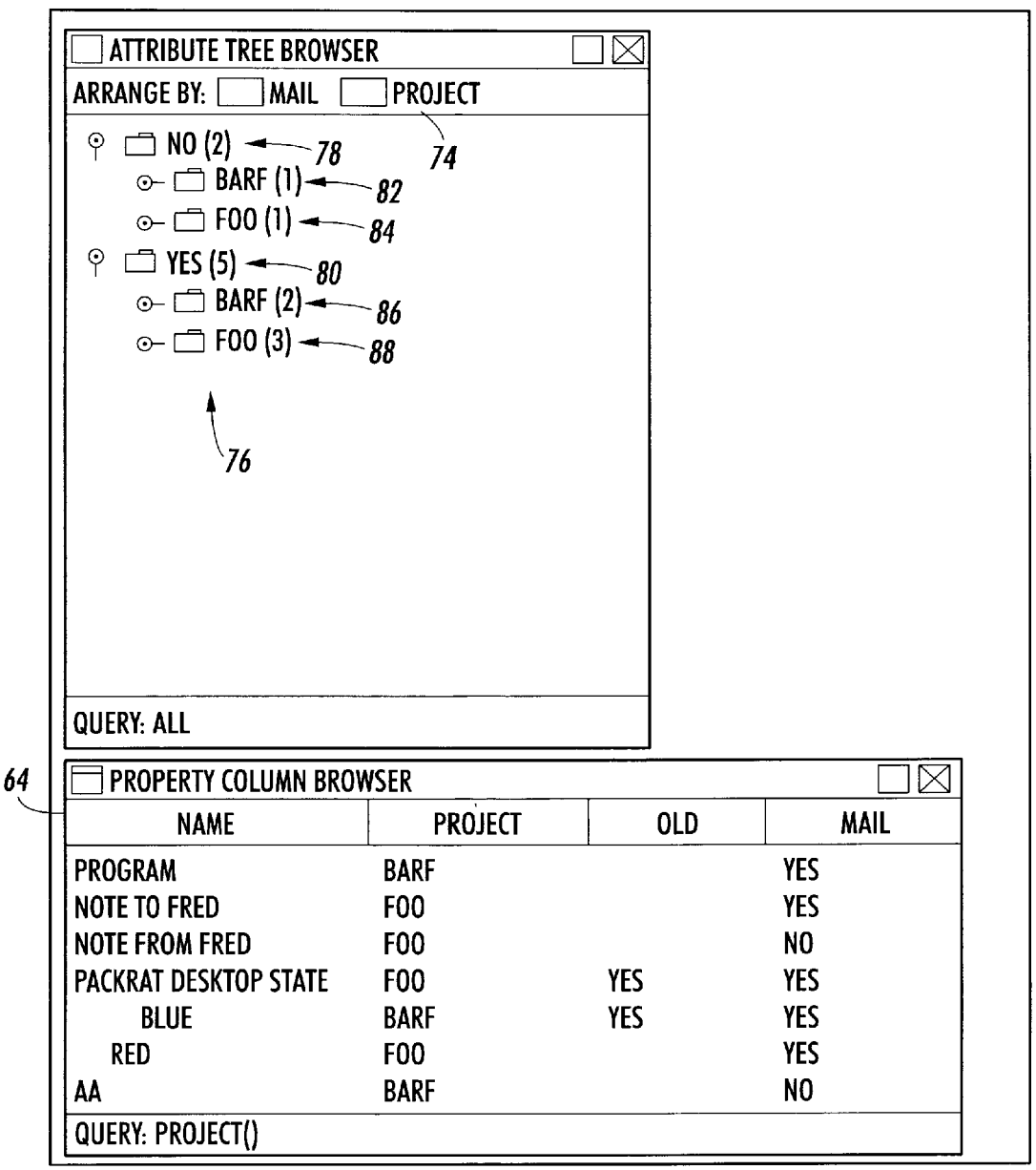

Turning to FIG. 5, the organization hierarchy 74 is further refined for its retrieval and organization of documents to classify documents by the project property (i.e. barf or foo). Attribute tree 76 is expanded to not only show two documents are not mail 78 and five documents are mail 80, but also informs a user that of the two "non-mail" documents 78, one has a barf project property 82 and another a foo project property 84. Similarly, under the "yes" project property display 80, there are two barf project properties 86 and three foo project properties 88. This configuration can be confirmed by the listings in property column browser window 64. As this example illustrates, the containment structure may be visualized in various ways. The results of the overall query are shown visually contained in window area 74, while the subsidiary organization is depicted as an attribute tree 30. In contrast to a table, for example, this visualization shows at a glance how many documents have the mail property attached, and how many of the documents have the barf project property or the foo project property attached.

Figure 6:
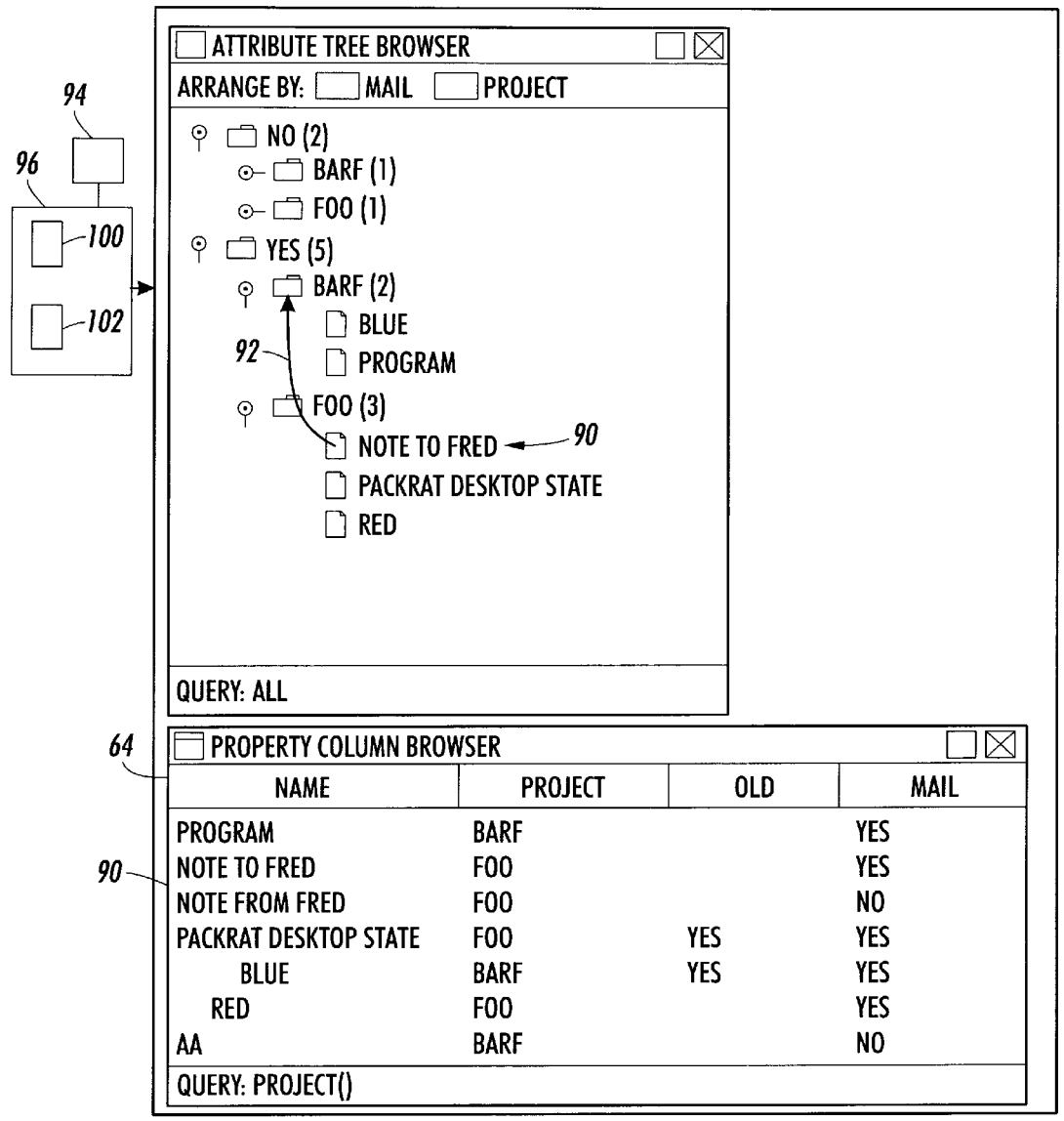

The present invention takes this style of visualization, which translates property organizations into containment metaphors, and also allows the user to alter properties via direct manipulation of the containment representations. Moving the portrayal of a document from one location to another commands that its properties are adjusted so that it now belongs in the new location and doesn't belong in the former location. The property tree of FIG. 6 has been further exploded to show the names of documents which are considered to have a mail property. The document "note to Fred" 90, for example, has a mail property attached (i.e. it is under the yes folder for mail) and has a foo project property. FIG. 6 shows that the "note to Fred" document 90 is to be moved from being designated as having a foo project property to a barf project property by arrow 92. The arrow 92 represents operation of a movement mechanism 94, which may be part of a computer system 96. Types of envisioned movement, mechanisms include but are not limited to a mouse, stylus, voice input device, or keyboard. The properties attached to the document "note to Fred" 90 may be verified by reference to property column browser 64, wherein "note to Fred" 90 is shown as being a mail for the project.

FIG. 7 shows, "note to Fred" 90 has been moved from being mail in a foo project to mail in a barf project. It is noted that in FIG. 6 the mail, foo containment structure has three documents and only has two documents in FIG. 7, and the number of documents in barf project folder of FIG. 6 is increased from two to three in FIG. 7. As previously noted, moving the portrayal of a document from one location to another results in the properties attached to that document being adjusted. In this example, as can be seen in the property column browser window 64 of FIG. 7, the property project of Fred is now barf 98. It is also noted that the mail property is still attached to the document, "note to Fred" 90 as it was not necessary to adjust this property in order that "note to Fred" 90 may exist at its new location.

The actions described above are accomplished, in one embodiment, by use of a property analyzer 100 and property changer 102, which may be in the form of software operating on computer system 96, shown in FIG. 6. It is to be appreciated that the discussed elements are shown in a generalized form. Also, for clarity the components described in FIG. 6 are not shown in all of the remaining figures. However, it is to be understood that such elements are used to obtain the disclosed operations. The property analyzer 100, senses operation of the movement mechanism 94, which cause property analyzer 100 to analyze the properties attached to the document to be moved. The property changer 102 alters at least one of the properties of the document based on information received from the property analyzer, in order that the move is accomplished. The property changer may be designed to perform logic operations, such as described in more detail below.

Since the metaphor concept will work in both ways, the view of document organization in terms of containers can be the user's dominant mode of interaction and their principle manner of thinking about documents. The browser's state can be consistent, so that once a particular view of properties in terms of containers is set up, the user has the option of always seeing that view. The containers they will view on the screen are as persistent as typical directory folders, and documents can be moved among them, just like they can be among directories. The invention thus offers users the option of thinking in terms of familiar containment metaphors. Yet they have the advantages of a property system when it is desired. Particularly, they can construct alternate containment structures, search in terms of properties, have one document naturally fit in many places, etc.

Figure 8:
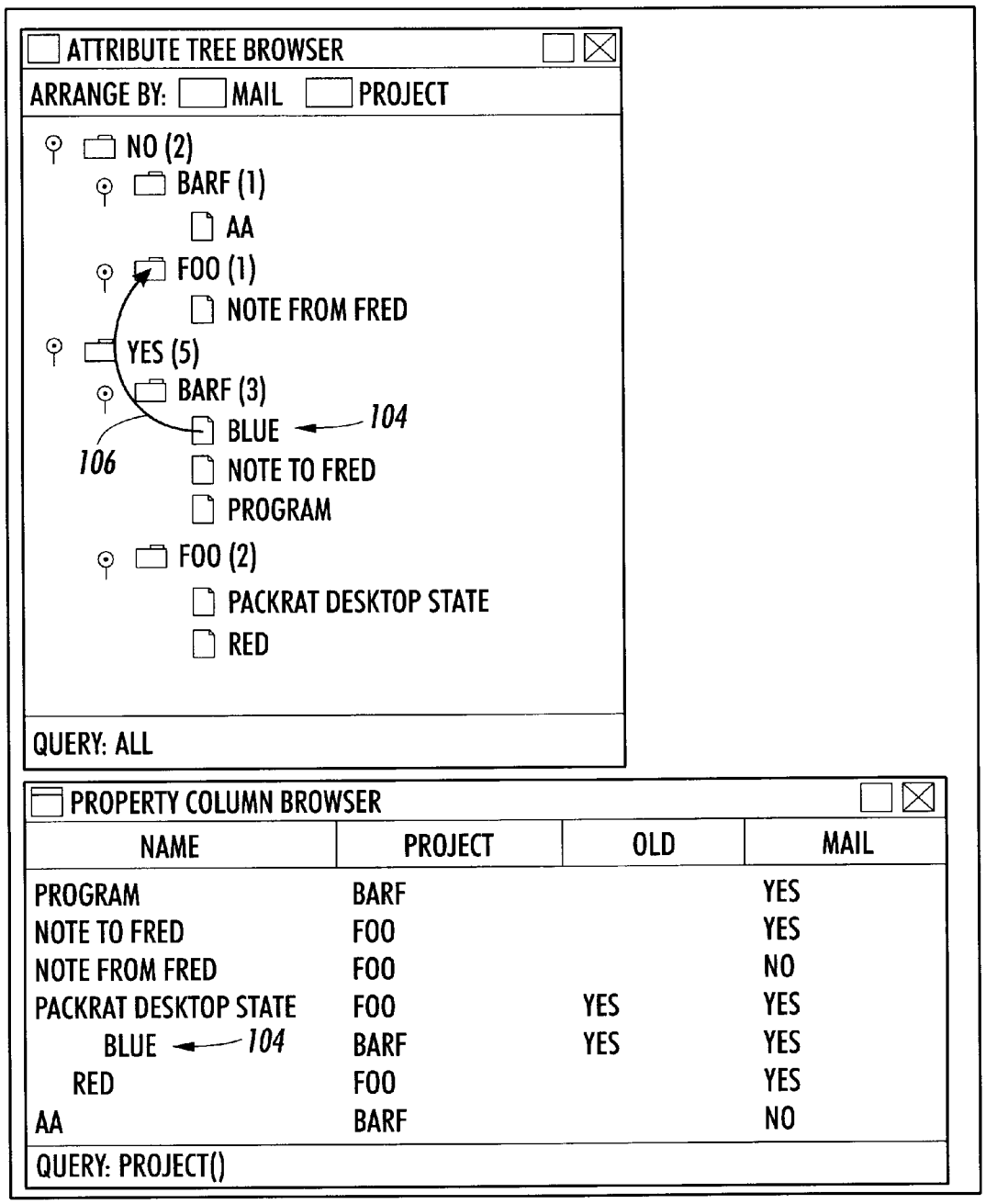

Turning to FIG. 8, the document "blue" 104 has a barf project property and a mail property. The user intends to move the "blue" document 104 from its present location to the foo project folder under no mail property, as shown by arrow 106. FIG. 9 depicts a time after this operation has been accomplished. As can be viewed by the property column browser window 64 of FIG. 9, document blue 104 now has a foo project property attached 108 and no longer has a mail property.

Figure 10:
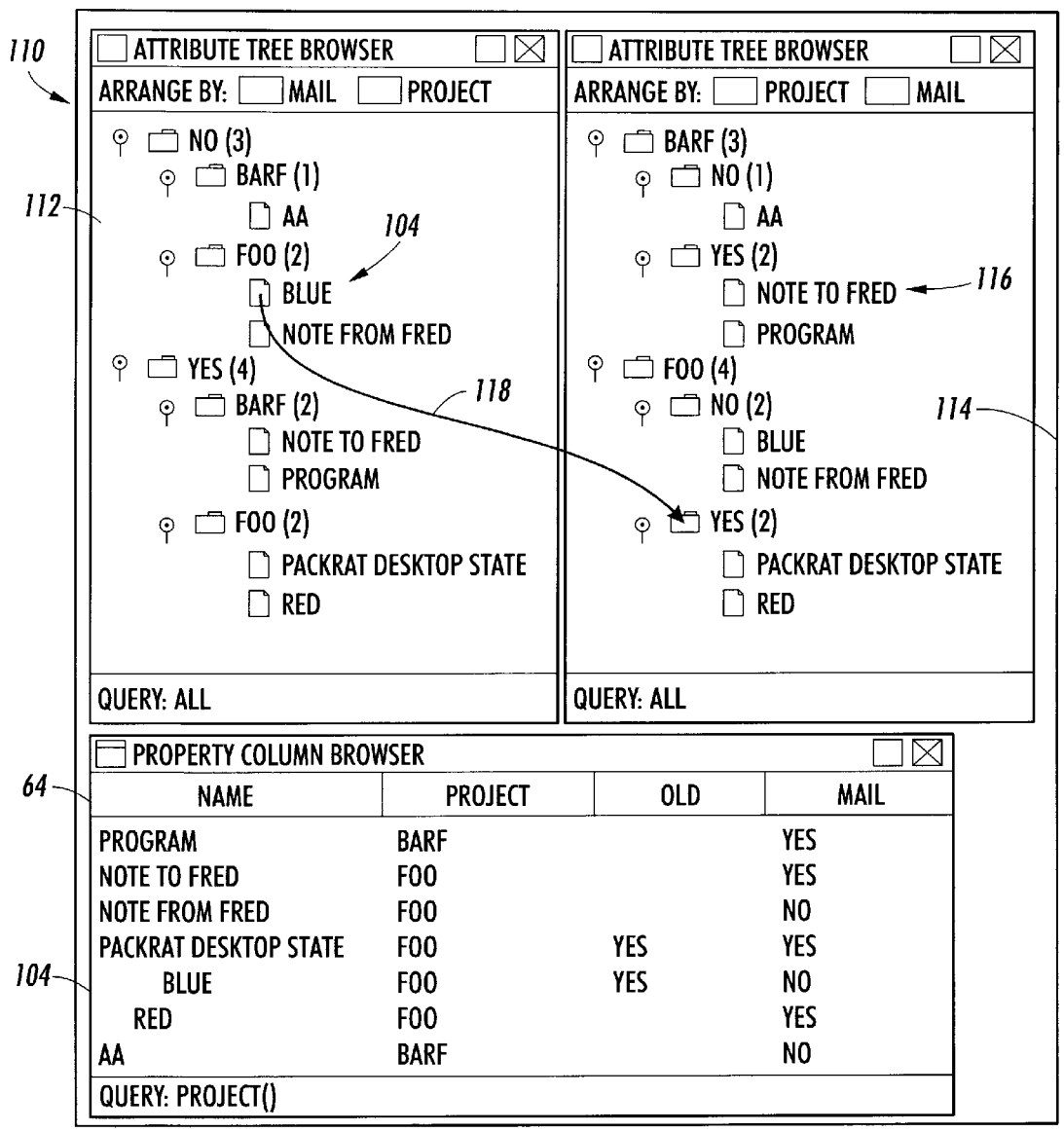

Turning to FIG. 10, the present invention also includes the capability of moving documents between separate attribute trees. For example, window 110 includes an attribute tree 112, and window 114 includes attribute tree 116. Document blue 104 is shown to not be mail for a foo project. This document is to be moved to attribute tree 114, where document blue 104 will be defined as mail for project foo, as designated by line 118.

Figure 11:
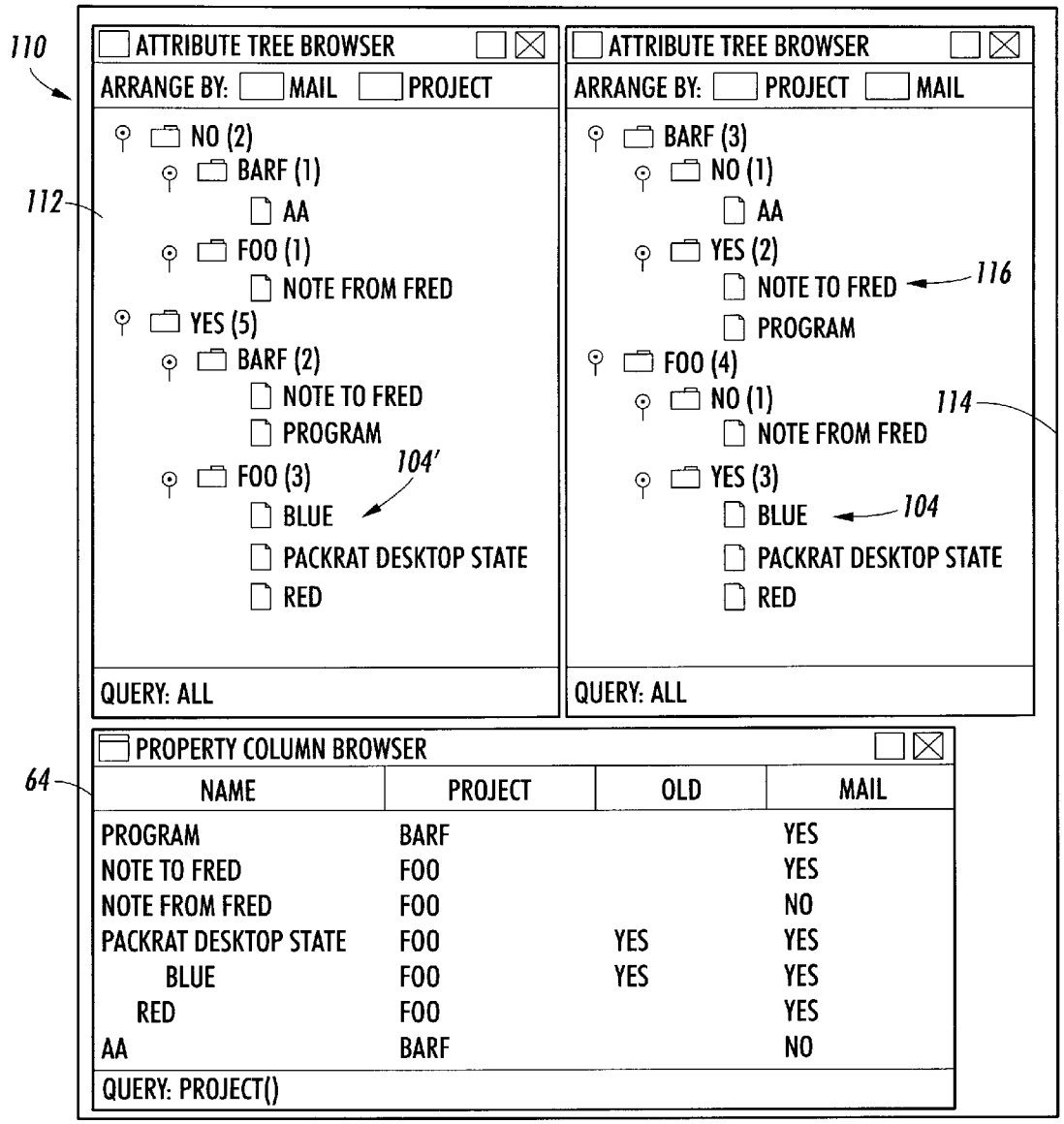

Property column browser window 64 of FIG. 10 shows blue in its premove state, and FIG. 11 depicts the arrangement after completion of the operation. As can be seen, document blue 104 has been moved to attribute tree 116 having the properties foo and mail (i.e. yes). However, it is to be noted that since attribute tree 112 also has a location which meets the determined expression, document blue 104' is also shown in attribute tree 112. Particularly, it is contained under the yes for mail and project foo which correlates to the same location, though arranged differently, as that of attribute tree 116. It is to be noted that the properties attached to document blue 10 (as well as document 104', which in effect are the same) have been changed appropriately in the property column browser windows 64.

Figure 12:
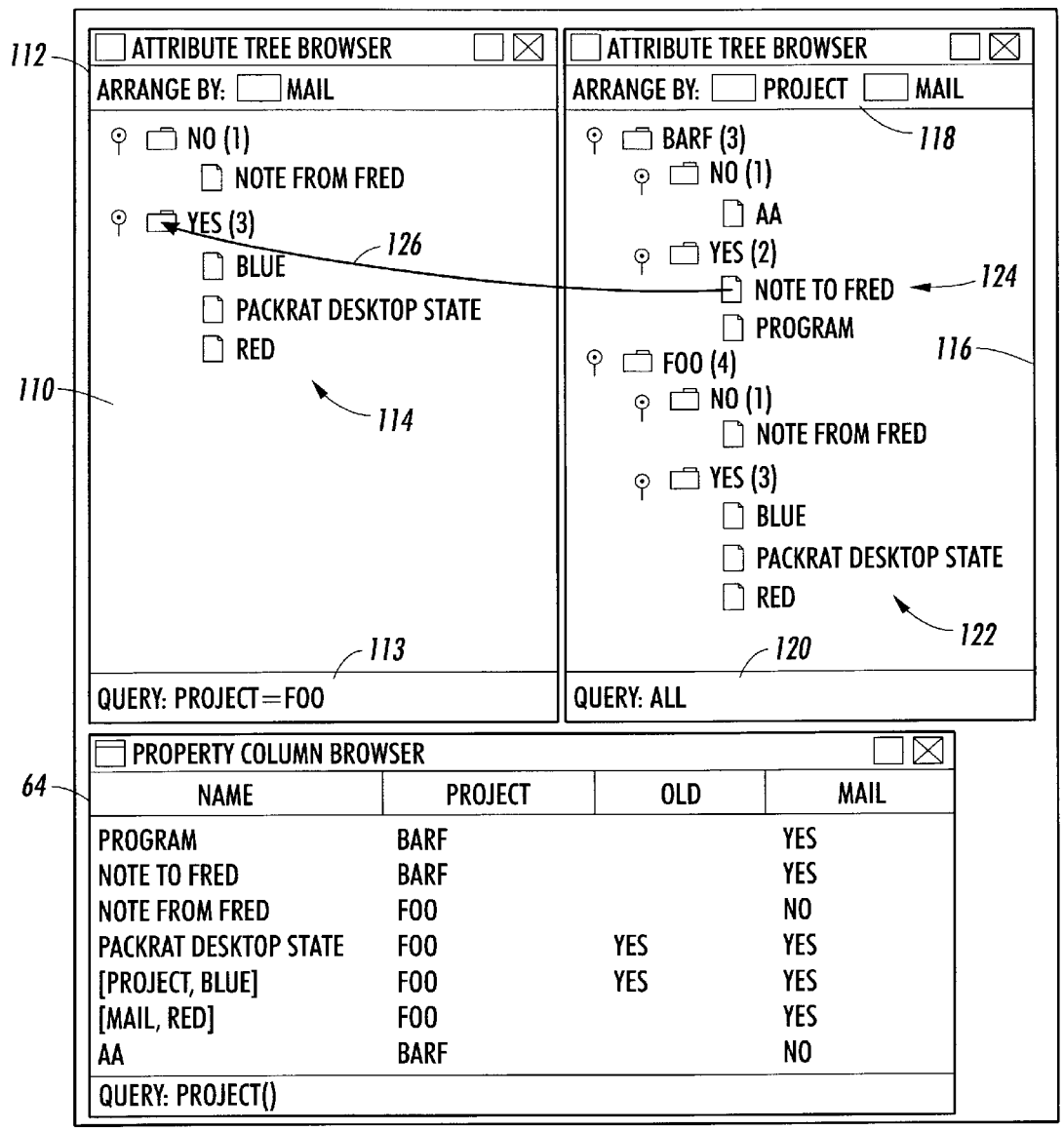
Figure 13:
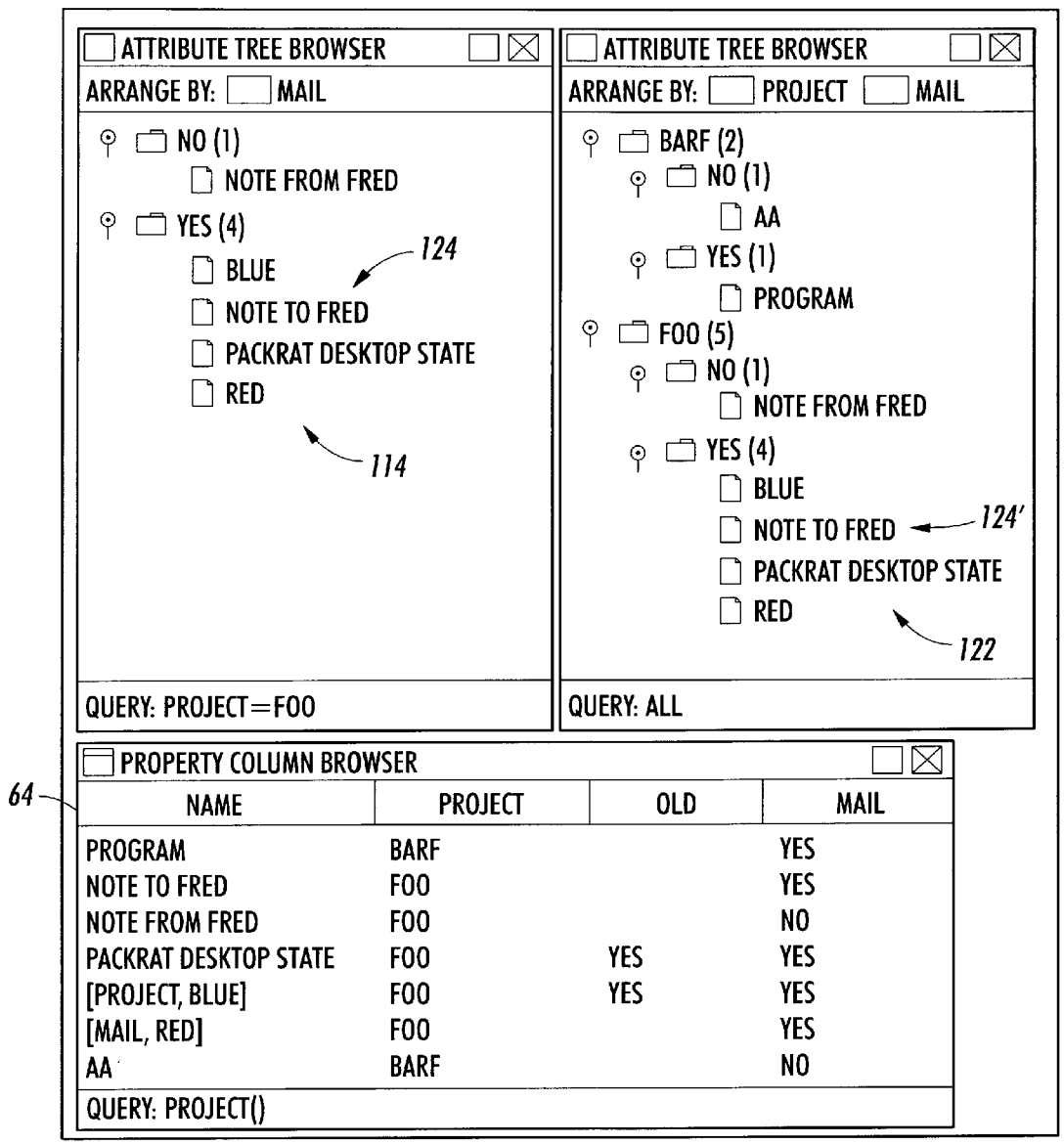

With attention to FIGS. 12 and 13, an additional concept of the present invention is illustrated. More particularly, screen 110 includes a hierarchical description area 112 to show items which are arranged having the mail property. However, further shown at the query input line 113 is that the requested query also provides only those documents also having the foo project property. Thus, the attribute tree 114 depicts only mail for the project property foo. Screen 116 shows a query hierarchy description area 118 arranged in the order of project properties and mail properties. Query input line 120, is requesting "all" documents in the system, resulting in the generation of attribute tree 122. As can be seen from this arrangement, the document "note to Fred" 124 has attached to it a mail property and a barf project property (see property column browser window 64). A user intends to move, as shown via arrow 126, the document "note to Fred" 124 into attribute tree 122 for mail (a yes mail property). Since the move does not change the mail property, this document property will not be altered. However, since the user is moving "note to Fred" 124 to a property tree 122 which is only displaying documents also having the property project foo, it is implicitly necessary to alter the property project of this document from barf to foo. FIG. 13 shows this move having been made with document "note to Fred" 124 displaying a foo property, as shown in property column browser 64.

Additionally, since property tree 122 is displaying all documents in a system, and as "note to Fred" 124 will now have property characteristics of mail and foo, "note to Fred" 124' will also be displayed in attribute property tree 122 of FIG. 13. Thus, even though the user does not directly make the change of attribute tree 122, since the characteristics of "note to Fred" 124 are appropriate for this positioning, in this embodiment, such action automatically occurs.

Figure 14:
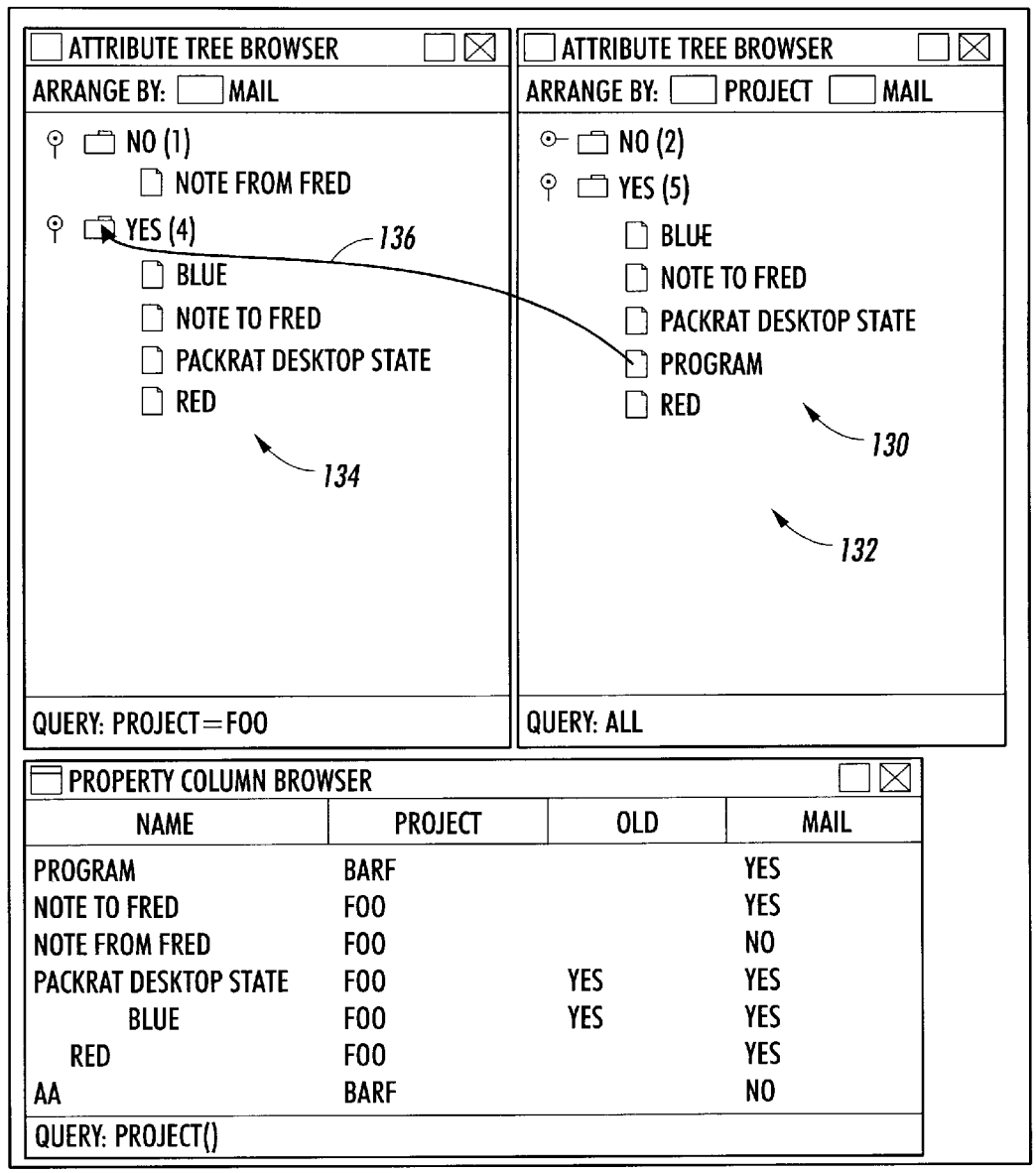
Figure 15:
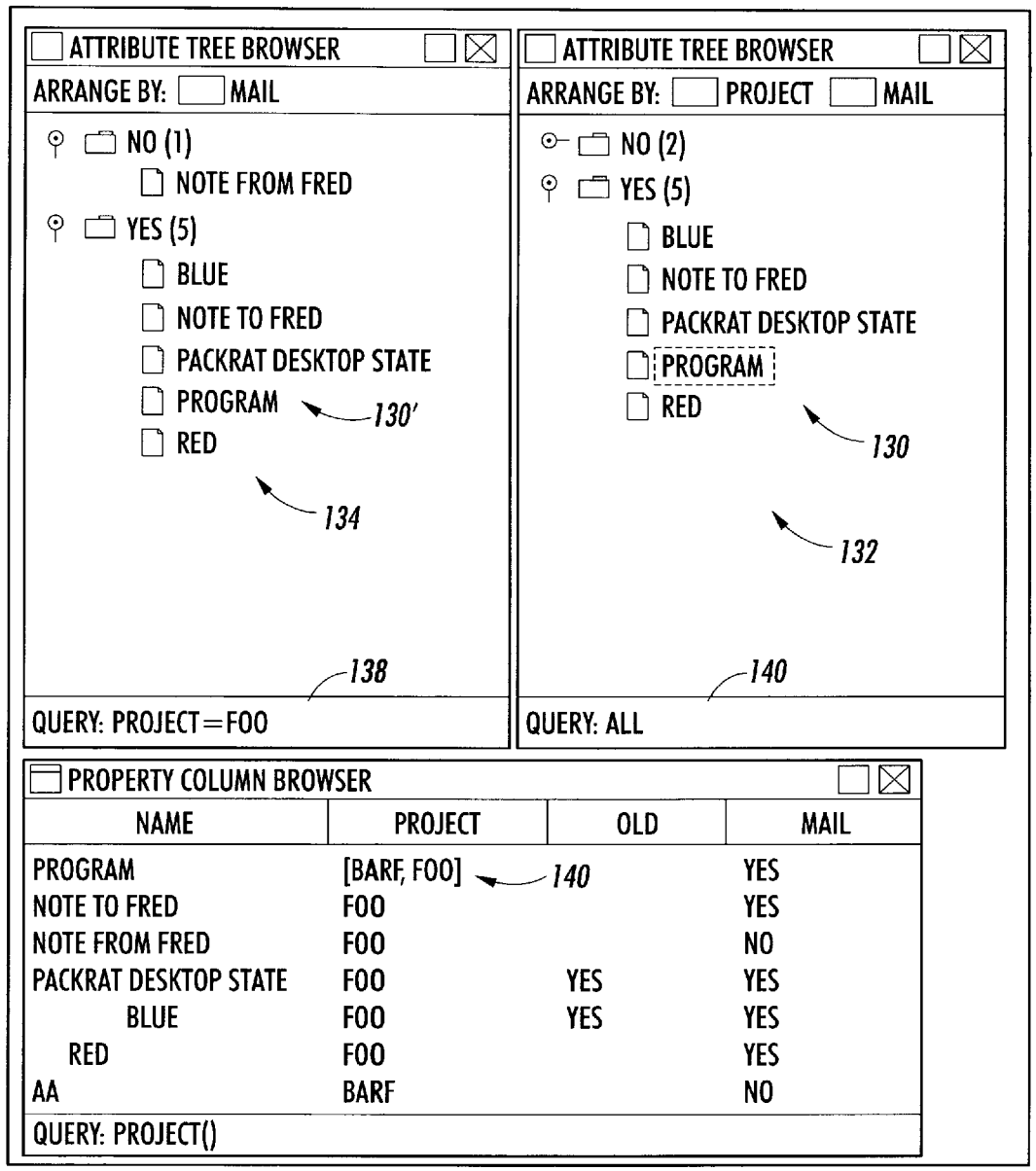

Turning to FIGS. 14 and 15, additional aspects of the present invention are shown. In particular, when a requested movement of a document is made, and such a move requires changing of an attached property, in one embodiment the document will no longer exist at the old or original location. FIG. 14 depicts another embodiment where a document, in this instance program 130 is being moved from a first attribute tree 132 to a second attribute tree 134 as depicted by line 136. The document program 130, as shown in property column browser 64 has attached to it the barf project property and the mail property. In this embodiment the document is maintained in the original location as well as locating it in a secondary location. The result of this move is illustrated in FIG. 15, wherein program 136 is maintained in attribute tree 132, and at the same time is now in attribute tree 134 as program 130'. An aspect to understand regarding this process is that attribute tree 134 is showing only documents having the foo project property attached as can be seen by the query line 138 whereas the query line 140 is for all documents. This duel representation is possible, since document program 136 (136') will have attached a barf project property as well as a foo project property (i.e. [barf, foo]), 140. Thus, manipulation in the present invention may result in the document being defined under multiple categories.

It is to be understood that this does not mean that there will not be moves requested by a user, which may be impossible or ambiguous. The invention, however, clearly defines the intent of a move, and a mechanism for determining whether that intent can, in fact, be carried out in an unambiguous way.

In general, each location on the screen is associated with a condition, a boolean expression involving property values that describes the requirements for a document to appear in that location. A drag from one location to another requires that the properties be adjusted so that the new condition becomes true, while the original condition becomes false (or, in another embodiment, while the original condition is preserved). Since the conditions can involve boolean expressions, they can become complicated. Queries, for example, can easily give rise to complicated conditions. That leads to a potential problem of interpretation. Whenever a condition mentions more than one property, there may be several ways to adjust the properties of a document to make the condition true or false. For example, if a document satisfies the condition that the "project" is "barf" and the property "importance" is "high", it can be made to not satisfy the condition by removing either the "project" or "importance" properties. Potentially, this could lead to ambiguity in interpreting the intent of a direct manipulation.

The problem is made tractable because direct manipulation doesn't only involve adding or removing one condition, but adding one condition while removing or preserving another. In the case of a "copy" drag, the manipulation adds one condition while preserving another. The combination of the two conditions constrains the possible solutions in typical cases.

For example, consider an attribute tree where the top level of the hierarchy describes the values of "project", and a lower level describes "mail." Suppose that the barf project folder has two sub-folders, one with the property "mail" set to "yes" and one with the property "mail" set to "no", and the user drags a document from the "yes" sub-folder to the "no" sub-folder. Based on the conditions of the folders, the system analyzes this as a drag from a location that requires "project" to be "barf" and "mail" to be "yes" to a location that requires "project" to be "barf" and "mail" to be "no." Thus, it requests a change so that "project=barf∧mail=yes" becomes false while "project=barf∧mail=no" becomes true. Making that change definitely requires changing "mail" from "yes" to "no", and can be made without changing any other properties. Based on this, the drag operation is analyzed as a request to change "mail" from "yes" to "no".

To compute the interpretation, the present invention first computes a single boolean expression that expresses what must hold after the manipulation. In the case of a drag, this is the final condition co-joined with the negation of the initial condition. In the example, that is "~(project=barf∧mail=yes)∧(project=barf∧mail=no)." Then it logically converts the expression into disjunctive normal form. The example becomes "[~project=barf )∧project=barf∧mail=no]∨[~(mail=yes)∧project=barf∧mail=no]." The different cases of the disjunct describe the different ways of satisfying the manipulation.

The present invention examines each case of the disjunct and determines which of its clauses are already satisfied and what changes are required to make the case true. In this example, the first case of the disjunct is inconsistent because it requires "project" to both be "barf" and not be "barf." Only the second case is consistent and it calls for changing "mail" which was "yes" to "no." It does not require a change of "project", as "project" is already "barf." The foregoing analysis results in a unique interpretation.

One manner for carrying out the logic required to accomplish this reasoning is through use of Logic Programming.

Such material is discussed, for example, in "Foundations of Logic Programming" by John Lloyd (Springer-Verlag, second edition, 1987), hereby incorporated by reference. This particular text provides algorithms for finding a model of a boolen expression. These models may be adapted in the present invention for running the algorithm to find all possible models in order to achieve the user's objective, and choosing the one that requires the fewest changes to the properties. While the above text has been cited, other texts also discuss the well-known concepts to accomplish efficient operation. It is understood that interpretations of particular moves may be obtained intuitively, without general logical manipulation. However, by using the generalized approach of the foregoing, the invention is able to interpret drags between different levels of a hierarchy or between different hierarchies (i.e. different attribute trees). The interpretation is always consistent, in that the drag asks for a change from one condition to another. The transition is a natural interpretation, as it aligns with the manipulation in removing the document from one location and placing it into another location.

It is appreciated at times there may be several different consistent cases in the disjunct. However, if each case calls for the same changes, there is a single unique interpretation. Even if different cases call for different changes, there is a unique interpretation if the changes called for by one of the cases is the smallest, in the sense that all other cases make those changes as well as some others. Therefore, in one embodiment of the present invention, the system is designed to accept the smallest change as the desired interpretation. Empirically, such a solution allows for a unique interpretation of the most direct manipulation operations.

Figure 16:
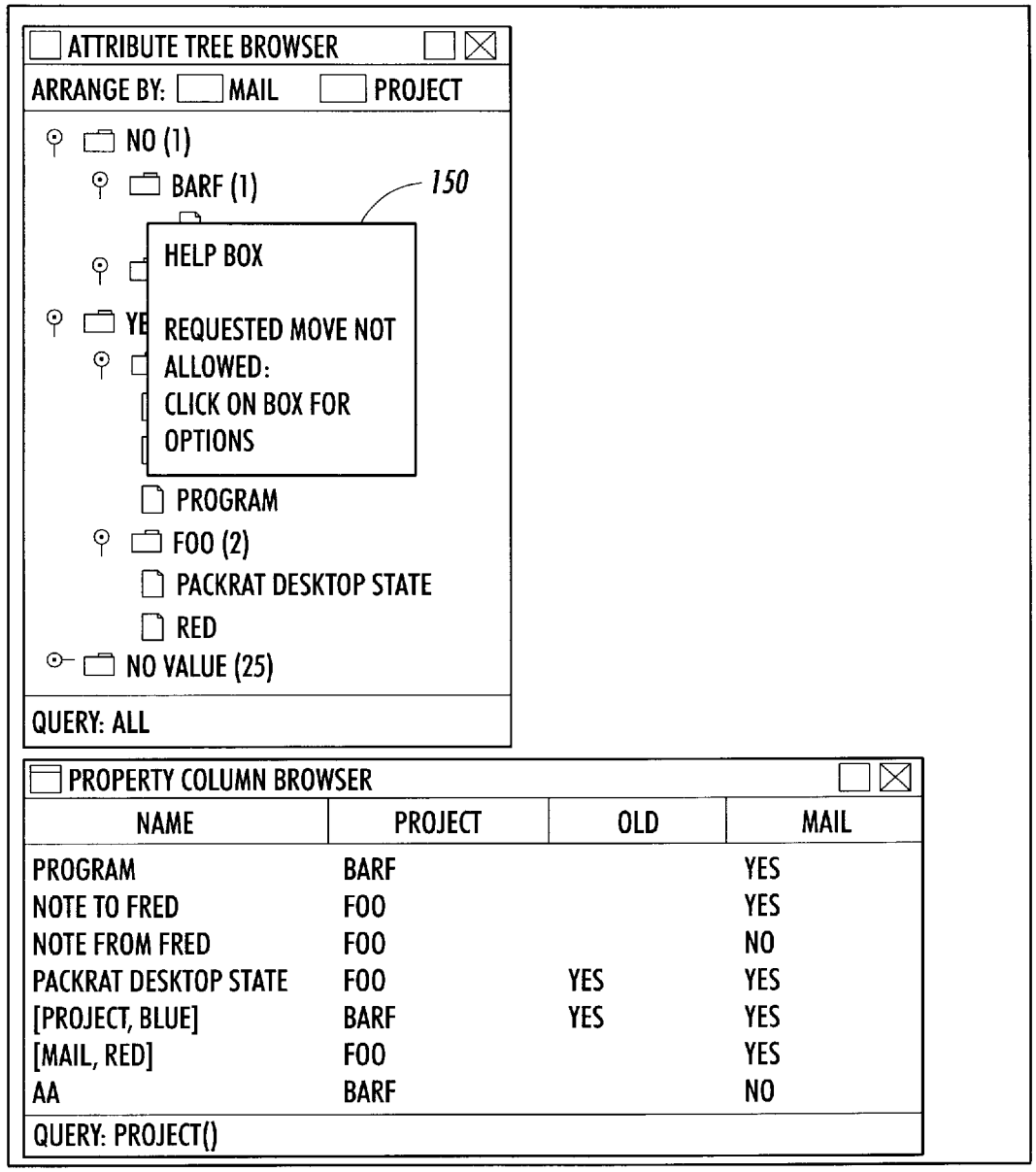
FIG. 16 illustrates a user indicator for an inappropriate move.

In situations, where there is not a unique interpretation, or where there is no consistent interpretation, the approach of the invention affords a natural manner to provide an explanation. As shown in FIG. 16, an indicator 150 may be placed on the screen for the user, where the system can list all possible interpretations. In the case of no consistent interpretation, the system may present the property on which a source and target locations impose inconsistent constraints. Indicators which may be implemented include, but are not limited to, a help box, tactile feedback on a mouse, i.e. vibrations or not allowing the mouse to "click", or a refusal to allow the move to be made, i.e. a drag operation does not allow a document representation to stay in its new position.

Thus, the present invention provides a user interface that portrays property value organizations as containment structures and allows the user to alter properties by direct manipulation of the containment structure. Using the manipulation system, inherent constraints are provided in selections or movements of documents such that ambiguities are avoided during the movement process. The containment structure in one particular implementation being provided as a higher level represented by queries and a viewer usable attribute tree.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having this described the above invention, it is now claimed:

1. In a document management system which employs properties to organize documents, a direct manipulation interface for visualizing document properties, comprising:

a repository which holds documents and attached properties;

a first visual containment structure configured to portray representations of documents in the repository having a first property type;

a second visual containment structure configured to portray representations of documents in the repository having a second property type;

a representation of a first document having the first property type, stored in the first containment structure;

a movement mechanism designed to move the representation of the first document, portrayed in the first containment structure, to a location in the second containment structure;

a property analyzer which senses operation of the movement mechanism and analyzes properties attached to the first document when the representation of the first document is to be moved into the second containment structure; and a property changer which alters at least one of the properties of the first document based on information received from the property analyzer.

2. The invention according to claim 1 wherein movement of the representation of the first document from the first containment structure to the second containment structure provides inherent constraints on the type of properties which may be altered by the property changes.

3. The invention according to claim 1 wherein more than the first property may be changed when the first document is moved from the first containment structure to the second containment structure.

4. The invention according to claim 3 wherein the containment hierarchies combine a query and an attribute tree derived from property values.

5. The invention according to claim 1 wherein only those properties are changed which are necessary to allow the first document representation to be located in the second containment structure with properties consistent for the second containment structure.

6. The invention according to claim 1 wherein the movement mechanism operates in two states, a first state is configured to move the representation from the first containment structure to the second containment structure, wherein the representation of the first document is removed from the first containment structure; and a second state is configured to copy the representation from the first containment structure to the second containment structure, wherein the representation of the first document is maintained in both the first containment structure and the second containment structure.

7. The invention according to claim 1 further including an alert message, wherein the alert message is generated whenever the movement mechanism attempts to move the first document to the second containment structure, when the attempted move violates a required Boolean expression.

8. The invention according to claim 1 wherein the movement mechanism is configured to be operated by a user, to thereby allow the user to alter properties attached to a document through direct manipulation of the first containment structure, the second containment structure, and the first document representation.

9. The invention according to claim 1 wherein the property changer alters the properties of the first document based on a solution of a Boolean expression.

10. The invention according to claim 9 wherein the property changer obtains the solution of the Boolean expression by an examination of each case of a disjunction, and generates a determination as to which of a plurality of possible disjuncts are satisfied.

11. The invention according to claim 1 wherein only the property needed to allow the first document representation to exist consistently in the second containment structure, will be altered.

12. The invention according to claim 1 wherein the first and the second containment structures allow for creation of multiple views of documents.

13. The invention according to claim 1 wherein the first and the second containment structures each have multiple containment levels.

14. A method of controlling representation and organization of documents, in a document management system which employs properties to organize and control the documents, the method comprising:

provBiding a user with access to properties of the document management system;

attaching, by the user, selected ones of the properties to documents of the document management system;

storing the attached selected properties;

forming a first containment structure configured to portray representations of documents in the repository having a first property type;

forming a second containment structure configured to portray representations of documents in the repository having a second property type;

selecting a first document representation having the first property type, portrayed in the first containment structure;

moving the first document representation having the first property type from the first containment structure to the second containment structure;

sensing the moving of the first document representation from the first containment structure to the second containment structure;

analyzing the properties attached to the first document, when the representation of the first document is to be moved into the second containment structure;

altering the properties of the first document whose representation is located in the second containment structure, based on information obtained during the analyzing step.

* * * * *